United States Patent [19]

Hagedorn et al.

[11] Patent Number: 5,057,208

[45] Date of Patent: Oct. 15, 1991

[54] METHOD FOR THE PRODUCTION OF POTASSIUM CHLORIDE WITH $K_2O$ CONTENT OF MORE THAN 55 WEIGHT PERCENT

[75] Inventors: Fritz Hagedorn; Gerd Peuschel, both of Sehnde; Arno Singewald, Kassel-Wilh., both of Fed. Rep. of Germany

[73] Assignee: Kali und Salz Aktiengesellschaft, Kassel, Fed. Rep. of Germany

[21] Appl. No.: 256,062

[22] Filed: Oct. 6, 1988

Related U.S. Application Data

[63] Continuation of Ser. No. 125,763, Nov. 23, 1987, abandoned, which is a continuation of Ser. No. 779,824, Sep. 25, 1985, abandoned.

[30] Foreign Application Priority Data

Sep. 25, 1984 [DE] Fed. Rep. of Germany ....... 3435124

[51] Int. Cl.$^5$ .......................... B03D 1/02; B03D 1/08
[52] U.S. Cl. ........................................ 209/166; 209/17
[58] Field of Search ......................... 209/166, 167, 17; 252/61; 423/179, 499

[56] References Cited

U.S. PATENT DOCUMENTS

| | | | |
|---|---|---|---|
| 2,364,520 | 12/1944 | Cole | 209/166 |
| 2,604,988 | 7/1952 | Colin | 209/166 |
| 2,702,121 | 2/1955 | Colin et al. | 209/166 |
| 2,733,809 | 2/1956 | Wreye | 209/168 X |
| 2,931,502 | 4/1960 | Schoeld | 209/170 X |
| 2,984,348 | 5/1961 | Adams | 209/166 X |
| 2,999,595 | 9/1961 | Schoeld | 209/170 X |
| 3,137,650 | 6/1964 | Smith | 209/166 |
| 3,259,237 | 7/1966 | Schoeld et al. | 209/166 X |
| 3,380,666 | 4/1968 | Barnhill | 209/166 |
| 3,446,443 | 5/1969 | Clark et al. | 209/166 X |
| 3,451,788 | 6/1969 | Smith | 209/166 |
| 3,596,763 | 8/1971 | Berthan | 209/166 |
| 3,640,385 | 2/1972 | Smith | 209/166 |
| 3,782,546 | 1/1974 | Kirwin | 209/166 |
| 4,045,335 | 8/1977 | Adams | 209/166 |
| 4,198,288 | 4/1980 | Levine | 209/166 |
| 4,504,092 | 3/1985 | Bichara et al. | 209/166 X |
| 4,608,154 | 8/1986 | Chan | 209/166 |

FOREIGN PATENT DOCUMENTS 931702 7/1955 Fed. Rep. of Germany.

OTHER PUBLICATIONS

Publication by Mohr and Böhm in Freiberger Forschungshefte, A 267 (1963), pp. 103-112.

*Primary Examiner*—Stanley S. Silverman
*Assistant Examiner*—Thomas M. Lithgow
*Attorney, Agent, or Firm*—Michael J. Striker

[57] ABSTRACT

In a method for manufacturing potassium chloride with a $K_2O$ content of 55 wt. % from the fine salt resulting from the decomposition of carnallite, n-alkyl amine salts are used as conditioning agents, and flotation media containing magnesium and potassium chloride are used to separate this fine decomposition salt in an initial flotation stage into a grain size fraction of <0.1 mm as the first pre-concentrate and a residue having a grain size of >0.315. After the conditioning, this residue is again floated and the potassium chloride comes to the surface as a second pre-concentrate. Then the potassium chloride is separated from the mixture of the two pre-concentrates, without any further conditioning, in another flotation stage, and collected.

2 Claims, 1 Drawing Sheet

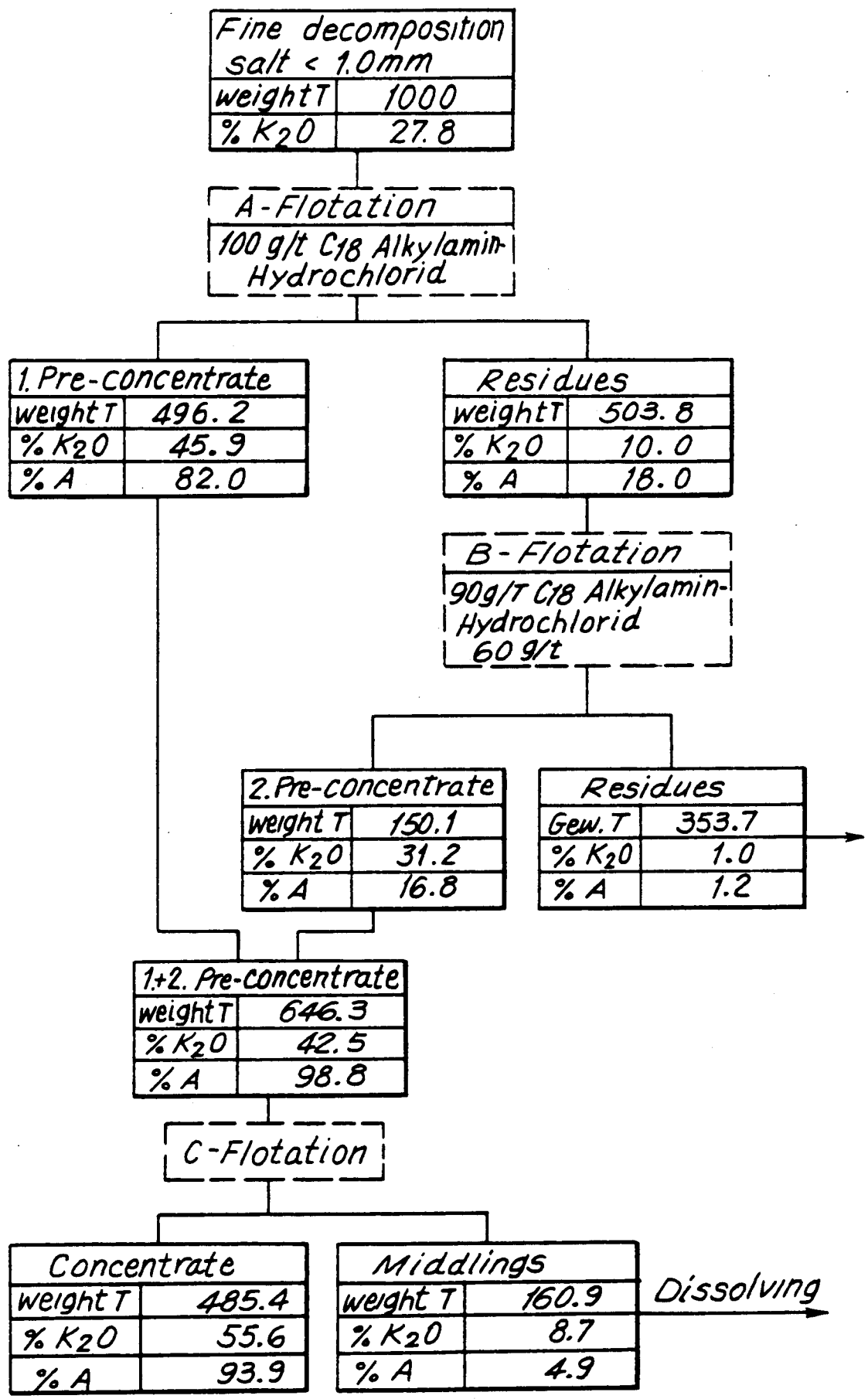

METHOD FOR THE PRODUCTION OF POTASSIUM CHLORIDE WITH K₂O CONTENT OF MORE THAN 55 WEIGHT PERCENT

This application is a continuation of application Ser. No. 125,763, filed Nov. 23, 1987 now abandoned, which is in turn a continuation of application Ser. No. 779,824 filed Sept. 25, 1985 (now abandoned).

BACKGROUND OF THE INVENTION

The present invention pertains to the production, by flotation, of potassium chloride with a high $K_2O$ content from the salt accumulating during the cold decomposition of carnallite or of potash salts containing carnallite.

It is known from German Patent PS 931 702 that the carnallite from the potash salt ground to the fineness required for flotation is floated in the presence of water-soluble salts of primary saturated or unsaturated alkyl amines in Q liquors which are used as the flotation media, and it is then separated from the other constituents of the potash salt to permit it to be processed into high-grade potassium chloride by means of cold decomposition or hot dissolution.

German Patent 931 702 also describes a procedure according to which the carnallite contained in the potash salt is first decomposed by a dilute liquor containing magnesium chloride and the resulting mixture of sylvite and rock salt is then floated in the decomposition liquor. With this process decomposition and flotation can be carried out simultaneously in the flotation facility. However, according to German Patent 931 702 it is also possible first to decompose the carnallite contained in the potash salt and to subject the resulting mixture to flotation, in the course of which the potassium chloride floats to the surface and is collected. For this purpose it is recommended that the carnallite contained in the potash salt, which is to start with merely coarsely ground, be decomposed in a liquor that is capable of taking up all the magnesium chloride contained in the carnallite. In the process a potassium chloride having particle size of $<1.0$ mm is formed from the carnallite. Because the natural sylvite contained in the potash salt is intergrown to a very large extent with rock salt and sometimes with kieserite, the coarse fractions of the decomposition salt contained in the decomposition mixture must be separated out and ground before the sylvite can be extracted by flotation.

However, during the flotation of such partially ground decomposition products on a large industrial scale, considerable quantities of residues with a $K_2O$ content of 8 to 10 wt. % accumulate. In order to extract the amount of potassium chloride corresponding to this $K_2O$ content, these residues are dissolved, as described for example in the publication by Mohr and Böhm in Freiberger Forschungshefte", A 267 (1963), pp. 103–112.

In this way, flotation can increase the quality, i.e. the $K_2O$ content, of the potassium chloride to no more than 45 wt. %, and the $K_2O$ recovery is in the order of 85%. The accumulating flotation residue still contains about 8 to 10% $K_2O$ and it has to be dissolved in order to recover this valuable material. According to the remarks made by Mohr and Böhm the fine grain size of the potassium chloride obtained by decomposition hampers the recovery of high-grade potassium chloride concentrates despite the fact that it is practically free of any intergrowths. Even when the concentrates obtained by flotation from the decomposition salt are further purified in a secondary flotation process the products obtained contain only 50 wt. % $K_2O$.

SUMMARY OF THE INVENTION

It is an object of the present invention to obtain by froth flotation alone $K_2O$ from the fine salt produced in grain sizes of $\leq 1.0$ mm by the cold decomposition of carnallite or carnallitic potash salts, and consisting of potassium chloride in grain size of $<0.1$ mm, natural sylvite, rock salt and sometimes kieserite, without any prior mechanical separation of the coarse components being required.

The objects of the invention is attained by a method for the production of potassium chloride with a $K_2O$ content in excess of 55 wt. % from the fine salt obtained during the cold decomposition of carnallite or of carnallitic potash salt, and consisting essentially of the potassium chloride formed during the decomposition process, natural sylvite and possibly kieserite following conditioning with water-soluble salts of long-chain amines having 8 to 22 atoms in the molecule, said procedure employing flotation by flotation media containing magnesium chloride and potassium chloride. According to method of this invention:

a) after conditioning with 50 to 200 g n-alkyl amine salt per tonne, the fine decomposition salt is floated and the fine grained material ($<0.1$ mm) is separated off as a first pre-concentrate;

b) the residue obtained in the above process is again conditioned with 50 to 150 g n-alkyl amine salt per tonne and is then floated and the potassium chloride is separated off as the second pre-concentrate, and c) both pre-concentrates are jointly re-floated and the potassium chloride is separated off and collected.

A salt solution having an $MgCl_2$ content of to 320 g/liter, of the type that is obtained, for example, from the cold decomposition of carnallite, can be used as the flotation medium. Sylvite liquors containing 70 to 90 g/liter magnesium chloride and having a viscosity of about 2.5 cP have proved to be particularly suitable flotation media for implementing the procedure according to the invention. Also according to the invention, these flotation media can be recycled once the flotation residues have been separated from them.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure of the drawing is a block chart diagram illustrating the process for the production of potassium chloride according to the present invention.

DETAILED DESCRIPTION OF THE PREFERRED EMBODIMENT

As is known, the decomposition salt accumulating during the cold decomposition of carnallite is passed over screens together with the associated decomposition liquor and separated into a coarse salt having a grain size of $>1$ mm and a fine salt having a grain size of 1 mm and below. After the decomposition liquor has been separated from the coarse salt, the latter is returned to the dissolver. The fine salt having a grain size of up to 1 mm is also separated from the decomposition liquor and can then be used as a starting material for the procedure according to the invention. This fine salt has a $K_2O$ content of more than 20 wt. % and preferably of approx. 23 to 30 wt. %.

The method according to the invention is based on the discovery that when applying the techniques according to the invention, the extremely fine fraction having a grain size of <0.1 mm is satisfactorily floated off in a first froth flotation stage and can thus be separated from the coarser residue. This first froth flotation stage is A-Flotation in the flow chart diagram.

The residue left behind during this froth flotation contains about 10 wt. % $K_2O$ and it accumulates in an amount corresponding to approximately half the amount or decomposition salt used in the froth flotation process. This residue, together with the flotation medium, is then passed on to the second froth flotation stage, designated as B-Flotation, after 50 to 150 g n-alkyl amine salt per tonne of residue has once again been added to this mixture of residue and flotation medium.

Both flotation stages are carried out in the known manner at ambient temperature in customary facilities.

In the second froth flotation stage, the >0.1 mm grain fize fraction of the potassium chloride contained in the decomposition salt is separated out. The residue that accumulates in the process still contains up to 1.5 wt. % $K_2O$ and it can be discarded or passed on to a dissolver.

The concentrates of valuable materials contained in both flotation stages are jointly reprocessed by froth flotation without any further conditioning and a KCl concentrate with a $K_2O$ content of more than 55 wt. % is separated out from the flotation froth with a yield of more than 90%. During this clearer flotation stage, as well, a residue accumulates which may still contain 5 to 10% of the $K_2O$ amount present and it can therefore advantageously be fed to a dissolver.

With the combination of procedural steps according to the invention it is possible for the first time to extract a potassium chloride product with a $K_2O$ content of more than 55 wt. % from the fine salt that accumulates in the course of the decomposition of carnallite, and the $K_2O$ yield of the overall procedure amounts to more than 90% of the $K_2O$ present.

In the procedure according to the invention it is not necessary to mechanically separate and grind the coarse components of the fine decomposition salt so that, when proceeding according to the invention, the expenditures for the technical facilities and for the energy required by this mechanical separation process can be saved.

By purging it with water, it is an easy matter to convert the potassium chloride product obtained according to the manner of the invention into a potassium fertilizer containing more than 60 wt. % $K_2O$.

To afford better understanding of the procedure according to the invention, the attached Figure presents by way of example a flow chart in the form of a block diagram showing quantities in parts by weight and the %-contents, as well as the yields of $K_2O$.

It will be understood that each of the elements described above, or two or more together, may also find a useful application in other types of methods for the production of potassium chloride differing from the types described above.

While the invention has been illustrated and described as embodied in a method for the production of potassium chloride, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a method for the production, by froth flotation, of potassium chloride with a $K_2O$ content of >55 wt. % from the fine salt obtained during the decomposition of carnallite or of potash salts containing carnallite, and consisting essentially of the potassium chloride formed during the decomposition process, natural sylvite and kieserite, following conditioning of decomposition salt with water-soluble salts of primary n-alkyl amines with molecules containing 8 to 22 C-atoms, using flotation media containing magnesium chloride and potassium chloride, the improvement wherein:

a) the following conditions is performed with 50 to 200 g of n-alkyl amine salt per ton of decomposition salt, the fine salt of decomposition undergoes froth flotation and in the process a fine-grained potassium chloride with a grain of <0.1 mm is separated off as a first pre-concentrate, and a residue containing decomposition salt is obtained, b) said residue is again conditioned with 50 to 150 g of n-alkyl amine salt per ton of said residue and then undergoes froth flotation with potassium chloride being separated off as a second pre concentrate, and c) said first pre-concentrate and said second pre-concentrate are jointly subjected to froth flotation and the potassium chloride of desired concentration of $K_2O$ is separated off and collected.

2. Method according to claim 1, wherein a salt solution containing up to 320 g $MgCl_2$ per liter is used as the flotation medium in the froth flotation of decomposition salt in each of said steps.

* * * * *